United States Patent
Shimizu et al.

(10) Patent No.: US 10,266,673 B2
(45) Date of Patent: Apr. 23, 2019

(54) FLAME-RETARDANT POLYPROPYLENE COMPOSITION

(71) Applicant: ADEKA CORPORATION, Tokyo (JP)

(72) Inventors: Tatsuya Shimizu, Saitama (JP); Yang Ni, Saitama (JP)

(73) Assignee: ADEKA CORPORATION, Tokyo (JP)

( * ) Notice: Subject to any disclaimer, the term of this patent is extended or adjusted under 35 U.S.C. 154(b) by 0 days.

(21) Appl. No.: 15/541,835

(22) PCT Filed: Jan. 21, 2016

(86) PCT No.: PCT/JP2016/051684
§ 371 (c)(1),
(2) Date: Jul. 6, 2017

(87) PCT Pub. No.: WO2016/125591
PCT Pub. Date: Aug. 11, 2016

(65) Prior Publication Data
US 2018/0016419 A1    Jan. 18, 2018

(30) Foreign Application Priority Data
Feb. 6, 2015 (JP) ................................. 2015-021891

(51) Int. Cl.
| | |
|---|---|
| C08K 5/52 | (2006.01) |
| C08K 3/22 | (2006.01) |
| C08L 23/14 | (2006.01) |
| C08K 5/3462 | (2006.01) |
| C08K 5/3477 | (2006.01) |
| C09K 21/12 | (2006.01) |

(52) U.S. Cl.
CPC .............. *C08K 5/5205* (2013.01); *C08K 3/22* (2013.01); *C08K 5/3462* (2013.01); *C08K 5/3477* (2013.01); *C08L 23/14* (2013.01); *C09K 21/12* (2013.01); *C08K 2003/2296* (2013.01); *C08L 2201/02* (2013.01); *C08L 2207/04* (2013.01)

(58) Field of Classification Search
CPC . B44C 5/0492; B44C 1/18; B41F 3/36; B41F 9/066; B41F 9/003; B41F 19/001; B41M 1/10; B41M 7/0054; B41M 7/009; B32B 37/06; B32B 38/145; B32B 38/08; B32B 2038/0076; B32B 2305/54; B32B 2317/12; B32B 2317/16
See application file for complete search history.

(56) References Cited

U.S. PATENT DOCUMENTS

2003/0088000 A1*  5/2003  Kimura ................ C08K 5/5205
                                                              524/115

FOREIGN PATENT DOCUMENTS

| EP | 1 719 800 A1 | 11/2006 |
|---|---|---|
| EP | 2 210 914 A1 | 7/2010 |
| EP | 2 295 501 A1 | 3/2011 |
| EP | 2 789 653 A1 | 10/2014 |
| EP | 3 243 890 A1 | 11/2017 |
| EP | 3 255 095 A1 | 12/2017 |
| JP | 2008-063458 | 3/2008 |
| JP | 2013-082870 | 5/2013 |
| JP | 2013-515827 | 5/2013 |
| JP | 2013-155244 | 8/2013 |
| JP | 2014-065822 | 4/2014 |
| JP | 2014-523460 | 9/2014 |

OTHER PUBLICATIONS

International Search Report, PCT/JP2016/051684, dated Apr. 12, 2016.
Supplementary European Search Report issued in Application No. 16746422, dated Aug. 10, 2018.

* cited by examiner

*Primary Examiner* — Robert D. Harlan
(74) *Attorney, Agent, or Firm* — Young & Thompson

(57) ABSTRACT

A disclosed flame-retardant polypropylene composition contains: a random copolymer polypropylene as a synthetic resin component; and a component (A) and a component (B) as flame retardant components, the component (A) being one or more melamine salts selected from the group consisting of melamine orthophosphate, melamine pyrophosphate, and melamine polyphosphate, and the component (B) being one or more piperazine salts selected from the group consisting of piperazine orthophosphate, piperazine pyrophosphate, and piperazine polyphosphate. Furthermore, as a flame retardant component, the flame-retardant polypropylene composition preferably further contains zinc oxide as a component (C). Also, as a synthetic resin component, the flame-retardant polypropylene composition preferably further contains a styrene-based thermoplastic elastomer.

11 Claims, No Drawings

FLAME-RETARDANT POLYPROPYLENE COMPOSITION

TECHNICAL FIELD

The present invention relates to a flame-retardant polypropylene composition having an excellent flame retardancy without impairing the physical properties that are inherent to resin (also called a flame-retardant polypropylene resin composition).

BACKGROUND ART

Polypropylene resin is widely used in various types of molded products such as films, sheets and structural components because it is not only excellent in mold processability, heat resistance, mechanical properties and the like, but also has advantages such as having a low specific gravity and being light. Also, in automobile applications and the like in which a reduction in the cost of shipping products and an improvement in fuel efficiency are required, there is a demand for a lighter synthetic resin molded product. The polypropylene resin is flammable, and it is thus necessary to blend a flame retarder in order to impart flame retardancy.

As the flame retarder, an intumescent flame retarder has an excellent flame retardancy. The intumescent flame retarder is composed mainly of polyphosphoric acid, pyrophosphoric acid and a salt of a nitrogen-containing compound, and provides flame retardancy by forming a surface intumescent layer when it is burnt to as to suppress diffusion of decomposed products and heat transfer. Such an intumescent flame retarder is disclosed in, for example, Patent Literature 1. However, a flame-retardant synthetic resin composition disclosed in Patent Literature 1 contains a fluorine-based anti-dripping agent, and for this reason, there is a possibility that the physical properties that are inherent to resin may be impaired.

Even if the fluorine-based anti-dripping agent is not used, there is a problem in that the physical properties that are inherent to resin are impaired if the flame retarder is contained in a large amount. Furthermore, the mass of the resin composition as a whole increases, which is not preferable from the viewpoint of saving energy. Accordingly, there is a demand for a light resin composition with a small amount of a flame retarder.

CITATION LIST

Patent Literature

Patent Literature 1: US 2003/0088000A1

SUMMARY OF INVENTION

Accordingly, it is a first object of the present invention to provide a light flame-retardant polypropylene composition having an excellent flame retardancy and excellent physical properties that are inherent to resin.

Also, it is a second object of the present invention to provide a light molded article having an excellent flame retardancy and excellent physical properties that are inherent to resin.

Means for Solving Problem

In order to solve the problems described above, the present inventors conducted in-depth studies, and the present invention has been accomplished.

Specifically, the present invention provides a flame-retardant polypropylene composition comprising:

a random copolymer polypropylene as a synthetic resin component; and a component (A) and a component (B) as flame retardant components, the component (A) being one or more melamine salts selected from the group consisting of melamine orthophosphate, melamine pyrophosphate, and melamine polyphosphate, and the component (B) being one or more piperazine salts selected from the group consisting of piperazine orthophosphate, piperazine pyrophosphate, and piperazine polyphosphate.

Also, it is preferable that the flame-retardant polypropylene composition according to the present invention contains zinc oxide as a component (C), as a flame retardant component.

Also, it is preferable that the flame-retardant polypropylene composition according to the present invention contains a styrene-based thermoplastic elastomer as a synthetic resin component.

Also, the present invention provides a molded article obtained from any one of the flame-retardant polypropylene compositions described above.

Also, it is preferable that the molded article according to the present invention has a density of 1020 $kg/m^3$ or less.

Effects of the Invention

According to the present invention, it is possible to provide a light flame-retardant polypropylene composition having an excellent flame retardancy and excellent physical properties that are inherent to resin. Also, according to the present invention, it is possible to provide a light molded article having flame retardancy and physical properties that are inherent to resin.

DESCRIPTION OF EMBODIMENTS

The present invention relates to a flame-retardant polypropylene composition. In the present invention, the term "flame retardancy" means a property of reducing the risk of catching fire, a property of, even if a fire is caught and combustion continues, delaying the combustion, or a property of self-extinguishing after combustion.

It is preferable that the composition according to the present invention satisfies the UL-94V standard, or in other words, has a flame retardancy according to the UL-94V standard of V-2 or more. It is preferable that the evaluation according to UL-94V standard is performed by using a test specimen having a thickness of 0.8 mm or more and 3.2 mm or less as illustrated in, for example, a test method described in examples given below. Also, in the present invention, the term "polypropylene composition" means a composition that contains one or more polypropylenes such as a polypropylene homopolymer, a polypropylene copolymer, and the like.

First, the synthetic resin component that is used in the flame-retardant polypropylene composition according to the present invention will be described.

In the flame-retardant polypropylene composition according to the present invention (hereinafter also referred to simply as "polypropylene composition according to the present invention"), as the synthetic resin component, a random copolymer polypropylene is used.

The random copolymer polypropylene may be a random copolymer that uses ethylene or/and butene-1 in addition to propylene as a monomer to be polymerized. That is, the random copolymer polypropylene may be a random copolymer of propylene and ethylene obtained by copolymerization of propylene with ethylene, a random copolymer of propylene and butene-1 obtained by copolymerization of propylene with butene-1, or a random copolymer of propylene, ethylene and butene-1 by copolymerization of propylene with ethylene and butene-1.

From the viewpoint of flame retardancy, it is preferable to use a random copolymer of propylene and ethylene. Also, from the viewpoint of flame retardancy, in the case where ethylene is included as a monomer to be copolymerized, the amount of ethylene is preferably 5.0 mass % or less in the monomer to be copolymerized. In particular, it is preferable to use a random copolymer of propylene and ethylene in which ethylene is contained in an amount of 5.0 mass % or less in the monomer to be copolymerized.

As the random copolymer polypropylene used in the present invention, commercially available products can be used. Examples of commercially available products include Prime Polypro J-721GR (available from Prime Polymer Co., Ltd.), Prime Polypro J-2021GR (available from Prime Polymer Co., Ltd.), Prime Polypro J-2023GR (available from Prime Polymer Co., Ltd.), Prime Polypro J-2041GA (available from Prime Polymer Co., Ltd.), Prime Polypro J-3021GR (available from Prime Polymer Co., Ltd.), Prime Polypro J226E (available from Prime Polymer Co., Ltd.), Prime Polypro J226T (available from Prime Polymer Co., Ltd.), Prime Polypro J227T (available from Prime Polymer Co., Ltd.), Prime Polypro J229E (available from Prime Polymer Co., Ltd.), Prime Polypro B221WA (available from Prime Polymer Co., Ltd.), Prime Polypro J232WA (available from Prime Polymer Co., Ltd.), Prime Polypro B241 (available from Prime Polymer Co., Ltd.), Prime Polypro F227D (available from Prime Polymer Co., Ltd.), Prime Polypro F219DA (available from Prime Polymer Co., Ltd.). Prime Polypro F329RA (available from Prime Polymer Co., Ltd.), Prime Polypro F-744NP (available from Prime Polymer Co., Ltd.), Prime Polypro F-744NPT (available from Prime Polymer Co., Ltd.), Prime Polypro F-794NV (available from Prime Polymer Co., Ltd.), Novatec EG6D (available from Japan Polypropylene Corporation), Novatec MG3F (available from Japan Polypropylene Corporation), Novatec EG8B (available from Japan Polypropylene Corporation), Novatec EG7F (available from Japan Polypropylene Corporation), Novatec EG7FTB (available from Japan Polypropylene Corporation), Novatec MG03BD (available from Japan Polypropylene Corporation), Sun Allomer PM731M (available from Sun Allomer, Ltd.). Sun Allomer PM731V (available from Sun Allomer, Ltd.), Sun Allomer PM822V (available from Sun Allomer, Ltd.), Sun Allomer PM921M (available from Sun Allomer, Ltd.), Sun Allomer PM731V (available from Sun Allomer, Ltd.), Sun Allomer PM923V (available from Sun Allomer, Ltd.), Sun Allomer PM931M (available from Sun Allomer, Ltd.), Sun Allomer PM931V (available from Sun Allomer, Ltd.), Sun Allomer PM940M (available from Sun Allomer, Ltd.), Sun Allomer PMA20V (available from Sun Allomer, Ltd.), Sun Allomer PB222A (available from Sun Allomer, Ltd.), Sun Allomer PS522M (available from Sun Allomer, Ltd.), Sun Allomer PC540R (available from Sun Allomer, Ltd.), Sun Allomer PC630A (available from Sun Allomer, Ltd.), Sun Allomer PC630S (available from Sun Allomer, Ltd.), Sun Allomer PC741R (available from Sun Allomer. Ltd.), Sun Allomer PF742S (available from Sun Allomer, Ltd.), Sun Allomer PH943B (available from Sun Allomer, Ltd.), and the like.

It is preferable that the random copolymer polypropylene has a melt flow rate of, for example, 0.5 g/10 min or more and 50 g/10 min or less, from the viewpoint of ease of molding and flame retardancy of the flame-retardant polypropylene composition, but the melt flow rate is not particularly limited thereto.

From the viewpoint of flame retardancy and weight reduction, the amount of the random copolymer polypropylene is preferably 40 mass % to 90 mass % in the polypropylene composition according to the present invention, more preferably 50 mass % to 90 mass %, even more preferably 65 mass % to 90 mass %, still more preferably 70 mass % to 85 mass %, and even still more preferably 75 mass % to 80 mass %. Particularly when the polypropylene composition according to the present invention contains a synthetic resin other than the random copolymer polypropylene, the amount of the random copolymer polypropylene is preferably 40 mass % to 85 mass %, and more preferably 50 mass % to 80 mass %.

Next, the flame retardant components that are used in the polypropylene composition according to the present invention will be described.

A melamine salt that is a component (A) used as a flame retardant component in the present invention is selected from the group consisting of melamine orthophosphate, melamine pyrophosphate and melamine polyphosphate. They may be used singly or as a mixture. Among them, from the viewpoint of flame retardancy, it is preferable to use melamine pyrophosphate. In the case where they are used as a mixture, it is preferable that the percentage of melamine pyrophosphate is higher than the others. Also, the molar ratio of pyrophosphoric acid and melamine in the melamine pyrophosphate is preferably 1:2.

The salts of phosphoric acid and melamine listed above can be obtained by reacting phosphoric acid or phosphoric acid salt with melamine, but the melamine salt used as the component (A) of the present invention is preferably melamine pyrophosphate or melamine polyphosphate obtained by thermally condensing 1 melamine orthophosphate and is more preferably melamine pyrophosphate.

A piperazine salt that is a component (B) used as a flame retardant component in the present invention is selected from the group consisting of piperazine orthophosphate, piperazine pyrophosphate and piperazine polyphosphate. They may be used singly or as a mixture. Among them, from the viewpoint of flame retardancy, it is preferable to use piperazine pyrophosphate. In the case where they are used as a mixture, it is preferable that the percentage of piperazine pyrophosphate is higher than the others. Also, the molar ratio of pyrophosphoric acid and piperazine in the piperazine pyrophosphate is preferably 1:1.

The salts of phosphoric acid and piperazine listed above can be obtained by reacting phosphoric acid or phosphoric acid salt with piperazine, but the piperazine salt used as the component (B) of the present invention is preferably piperazine pyrophosphate or piperazine polyphosphate obtained by thermally condensing 1 piperazine 2 orthophosphate, and is more preferably piperazine pyrophosphate.

The blending amount of the component (A) is preferably 5 to 60 parts by mass, more preferably 7 to 30 parts by mass, and even more preferably 9 to 20 parts by mass based on 100 parts by mass of the random copolymer polypropylene. On the other hand, the blending amount of the component (B) is preferably 10 to 90 parts by mass, more preferably 12 to 45 parts by mass, and even more preferably 14 to 30 parts by mass based on 100 parts by mass of the random copolymer polypropylene.

In the case where, in addition to the random copolymer polypropylene, an additional synthetic resin is blended as a synthetic resin component, the blending amount of the component (A) is preferably 5 to 60 parts by mass, more preferably 6 to 30 parts by mass, and even more preferably 7 to 20 parts by mass based on a total of 100 parts by mass of the random copolymer polypropylene and the additional synthetic resin. On the other hand, the blending amount of the component (B) is preferably 8 to 90 parts by mass, more preferably 9 to 45 parts by mass, and even more preferably 10 to 30 parts by mass based on a total of 100 parts by mass of the random copolymer polypropylene and the additional synthetic resin.

Also, the total amount of the component (A) and the component (B) is preferably 10 mass % to 35 mass %, more preferably 15 mass % to 30 mass %, and even more preferably 20 mass % to 25 mass % in the polypropylene composition according to the present invention, in order to provide an excellent flame retardancy and achieve a further weight reduction without impairing the physical properties of the random copolymer polypropylene. If the total amount is less than 10 mass %, it may not be possible to obtain a sufficient flame retardancy. If the total amount exceeds 35 mass %, the physical properties of the resin may be impaired, or the mass may increase.

Also, the content ratio (in mass) of the component (A) and the component (B) is preferably (A)/(B)=20/80 to 50/50, and more preferably (A)/(B)=30/70 to 50/50.

Next, a component (C) of the present invention will be described.

It is preferable that the flame-retardant polypropylene composition according to the present invention further contains zinc oxide as the component (C) that is a flame retardant component.

The zinc oxide may be surface-treated. As the zinc oxide, commercially available products can be used. Examples include zinc oxide Grade 1 (available from Mitsui Mining & Smelting Co., Ltd.), partially coated zinc oxide (available from Mitsui Mining & Smelting Co., Ltd.), Nanofine 50 (ultrafine zinc oxide particles having an average particle size of 0.02 μm: available from Sakai Chemical Industry Co., Ltd.), Nanofine K (ultrafine zinc oxide particles coated with zinc silicate having an average particle size of 0.02 μm: available from Sakai Chemical Industry Co., Ltd.), and the like.

From the viewpoint of flame retardancy, the amount of zinc oxide as the component (C) in the flame-retardant polypropylene composition according to the present invention is preferably 0.01 to 10 parts by mass, more preferably 0.5 to 10 parts by mass, and even more preferably 1.0 to 7.5 parts by mass based on a total of 100 parts by mass of the component (A) and the component (B).

Also, the total amount of the component (A), the component (B) and the component (C) in the case where the component (C) is blended as a flame retardant component is preferably 10 mass % to 35 mass % in the polypropylene composition according to the present invention, more preferably 15 mass % to 30 mass %, and even more preferably 20 mass % to 25 mass % in order to provide an excellent flame retardancy and achieve a weight reduction without impairing the physical properties of the random copolymer polypropylene. If the total amount is less than 10 mass %, it may not be possible to obtain a sufficient flame retardancy. If the total amount exceeds 35 mass %, the physical properties of the resin may be impaired, or the mass may increase.

From the viewpoint of improving shock resistance in addition to the flame retardancy, it is also preferable that the flame-retardant polypropylene composition according to the present invention contains, in addition to the random copolymer polypropylene, a styrene-based thermoplastic elastomer as a synthetic resin component.

The styrene-based thermoplastic elastomer used in the present invention may be a copolymer of styrene and/or α-methyl styrene with another monomer (for example, maleic anhydride, phenylmaleimide, methyl methacrylate, butadiene, acrylonitrile, or the like). Examples include: thermoplastic resins such as acrylonitrile-styrene (AS) resin, acrylonitrile-butadiene-styrene (ABS) resin, methyl methacrylate-butadiene-styrene (MBS) resin, heat-resistant ABS resin, acrylonitrile-acrylate-styrene (AAS) resin, styrene-maleic anhydride (SMA) resin, methacrylate-styrene (MS) resin, styrene-isoprene-styrene SIS) resin, acrylonitrile-ethylenepropylene rubber-styrene (AES) resin, styrene-butadiene-butylene-styrene (SBBS) resin, methyl methacrylate-acrylonitrile-butadiene-styrene (MIABS) resin; and hydrogenated styrene-based elastomer resins obtained by hydrogenation of double bonds of these butadienes or isoprenes such as styrene-ethylene-butylene-styrene (SEBS) resin, styrene-ethylene-propylene-styrene (SEPS) resin, styrene-ethylene-propylene (SEP) resin and styrene-ethylene-ethylene-propylene-styrene (SEEPS) resin. They may be used singly or as a blend thereof. Among them, from the viewpoint of flame retardancy, it is preferable to use a hydrogenated styrene-based elastomer, and more preferably a styrene-ethylene-butylene-styrene (SEBS) resin and a styrene-ethylene-propylene-styrene (SEPS) resin.

The content ratio (in mass) of the random copolymer polypropylene and the styrene-based thermoplastic elastomer in the case where the styrene-based thermoplastic elastomer is contained is preferably 10/1 to ⅓, more preferably 5/1 to ½, and even more preferably 3/1 to 1/1.5.

The flame-retardant polypropylene composition according to the present invention may contain a silicone oil in order to suppress secondary aggregation and improve water resistance. Examples of the silicone oil include a dimethyl silicone oil in which all side chains and terminal ends of polysiloxane are methyl groups, a methyl phenyl silicone oil in which some of the side chains of polysiloxane are phenyl groups, a methyl hydrogen silicone oil in which some of the side chains of polysiloxane are hydrogen, and copolymers thereof. It is also possible to use modified silicone oils in which organic groups are introduced into some of the side chains and/or terminal ends thereof, such as an amine-modified silicone oil, an epoxy-modified silicone oil, an alicyclic epoxy-modified silicone oil, a carboxyl-modified silicone oil, a carbinol-modified silicone oil, a mercapto-modified silicone oil, a polyether-modified silicone oil, a long-chain alkyl-modified silicone oil, a fluoroalkyl-modified silicone oil, a higher fatty acid ester-modified silicone oil, a higher fatty acid amide-modified silicone oil, a silanol-modified silicone oil, a diol-modified silicone oil, a phenol-modified silicone oil and/or an aralkyl-modified silicone oil.

Specific examples of the silicone oil include: dimethyl silicone oils such as KF-96 (available from Shin-Etsu Chemical Co., Ltd.), KF-965 (available from Shin-Etsu Chemical Co., Ltd.) and KF-968 (available from Shin-Etsu Chemical Co., Ltd.); methylhydrogen silicone oils or silicone oils having a methylhydrogen polysiloxane structure such as KF-99 (available from Shin-Etsu Chemical Co., Ltd.), KF-9901 (available from Shin-Etsu Chemical Co., Ltd.). HMS-151 (available from Gelest, Inc.), HMS-071 (available from Gelest, Inc.), HMS-301 (available from Gelest, Inc.) and DMS-H21 (available from Gelest, Inc.); methyl phenyl silicone oils such as KF-50 (available from Shin-Etsu Chemical Co., Ltd.), KF-53 (available from Shin-Etsu Chemical Co., Ltd.), KF-54 (available from Shin-Etsu Chemical Co., Ltd.) and KF-56 (available from Shin-Etsu Chemical Co., Ltd.); epoxy-modified silicone oils such as X-22-343 (available from Shin-Etsu Chemical Co., Ltd.), X-22-2000 (available from Shin-Etsu Chemical Co., Ltd.), KF-101 (available from Shin-Etsu Chemical Co., Ltd.), KF-102 (available from Shin-Etsu Chemical Co., Ltd.) and KF-1001 (available from Shin-Etsu Chemical Co., Ltd.); carboxyl-modified silicone oils such as X-22-3701E (available from Shin-Etsu Chemical Co., Ltd.); carbinol-modified silicone oils such as X-22-4039 (available from Shin-Etsu Chemical Co., Ltd.) and X-22-4015 (available from Shin-Etsu Chemical Co., Ltd.); and amine-modified silicone oils such as KF-393 (available from Shin-Etsu Chemical Co., Ltd.).

The flame-retardant polypropylene composition according to the present invention may contain a silane coupling agent in order to suppress secondary aggregation and provide water resistance and heat resistance. Examples of the silane coupling agent include: silane coupling agents having an alkenyl group such as vinyltrimethoxy silane, vinyltriethoxy silane, vinyltriacetoxy silane, vinyltris(2-methoxyethoxy)silane, vinylmethyldimethoxy silane, octenlytrimethoxy silane, allyltrimethoxy silane and p-styryltrimethoxy silane; silane coupling agents having an acrylic group such as 3-acryloxypropyltrinethoxy silane and 3-acryloxypropyltriethoxy silane; silane coupling agents having a methacrylic group such as 3-methacryloxy propylmethyldimethoxy silane, 3-methacryloxy propyltrimethoxy silane, 3-methacyloxy propylmethyldiethoxy silane, 3-methacryloxy propyltriethoxy silane and methacryloxy octyltrimethoxy silane; silane coupling agents having an epoxy group such as 2-(3,4-epoxycyclohexyl)ethyltrimethoxy silane, 3-glycidoxy propylmethyldimethoxy silane, 3-glycidoxy propyltrimethoxy silane, 3-glycidoxy propylmethyldiethoxy silane, 3-glycidoxy propyltriethoxy silane and glycidoxy octyltrimethoxy silane; silane coupling agents having an amino group such as N-2-(aminoethyl)-3-aminopropylmethyldimethoxy silane, N-2-(aminoethyl)-3-aminopropyltrimethoxy silane, 3-aminopropyltrimethoxy silane, 3-aminopropyltriethoxy silane, 3-triethoxysilyl N-(1,3-dimethyl-butylidene)propylamine, N-phenyl-3-aminopropyltrimethoxy silane, N,N'-bis[3-(trimethoxysilyl)propyl] ethylenediamine and a hydrochloride of N-(vinylbenzyl)-2-aminoethyl-3-aminopropyltrimethoxy silane; silane coupling agents having an isocyanurate group such as tris-(trimethoxysilylpropyl)isocyanurate; silane coupling agents having a mercapto group such as 3-mercaptopropylmethyldimethoxy silane, 3-mercaptopropyl trimethoxy silane and 3-mercaptopropyltriethoxy silane; silane coupling agents having an ureido group such as 3-ureidopropyltrimethoxy silane and 3-ureidopropyltriethoxy silane; silane coupling agents having a sulfide group such as bis(triethoxy silylpropyl)tetrasulfide; silane coupling agents having a thioester group such as 3-octanoylthio-1-propyltriethoxy silane; silane coupling agents having an isocyanate group such as 3-isocyanatepropyltriethoxy silane and 3-isocyanatepropyltrimethoxy silane.

Among the silane coupling agents, from the viewpoint of suppressing secondary aggregation and imparting water resistance and heat resistance, it is preferable to use silane coupling agents having an epoxy group.

As the silane coupling agent, commercially available products can be used. Examples of the vinyltrimethoxy silane include KBM-1003 available from Shin-Etsu Chemical Co., Ltd., A-171 available from Momentive Performance Materials, Inc., Z-6300 available from Dow Corning Toray Co., Ltd., GENIOSIL XL10 available from Wacker Asahi Kasei Silicone Co., Ltd. and SILA-ACE S210 available from Nichibi Trading Co., Ltd. Examples of the vinyltriethoxy silane include KBE-1003 available from Shin-Etsu Chemical Co., Ltd., A-151 available from Momentive Performance Materials, Inc., Z-6519 available from Dow Corning Toray Co., Ltd., GENIOSIL GF56 available from Wacker Asahi Kasei Silicone Co., Ltd. and SILA-ACE S220 available from Nichibi Trading Co., Ltd. Examples of the vinyltriacetoxy silane include GENIOSIL GF62 available from Wacker Asahi Kasei Silicone Co., Ltd. Examples of the vinyltris(2-methoxyethoxy)silane include A-172 available from Momentive Performance Materials, Inc. Examples of the vinylmethyldimethoxy silane include A-2171 available from Momentive Performance Materials, Inc. and GENIOSIL XL12 available from Wacker Asahi Kasei Silicone Co., Ltd. Examples of the octenlytrimethoxy silane include KBM-1083 available from Shin-Etsu Chemical Co., Ltd. Examples of the allyltrimethoxy silane include Z-6825 available from Dow Corning Toray Co., Ltd. Examples of the p-styryltrimethoxy silane include KBM-1403 available from Shin-Etsu Chemical Co., Ltd. Examples of the 3-acryloxypropyl trimethoxy silane include KBM-5103. Examples of the 3-methacryloxy propylmethyldimethoxy silane include KBM-502 available from Shin-Etsu Chemical Co., Ltd. and Z-6033 available from Dow Corning Toray Co., Ltd. Examples of the 3-methacryloxy propyltrimethoxy silane include KBM-503 available from Shin-Etsu Chemical Co., Ltd., A-174 available from Momentive Performance Materials, Inc., Z-6030 available from Dow Corning Toray Co., Ltd., GENIOSIL GF31 available from Wacker Asahi Kasei Silicone Co., Ltd. and SILA-ACE S710 available from Nichibi Trading Co., Ltd. Examples of the 3-methacryloxy propylmethyldiethoxy silane include KBE-502 available from Shin-Etsu Chemical Co., Ltd. Examples of the 3-methacryloxy propyltriethoxy silane include KBE-503 available from Shin-Etsu Chemical Co., Ltd. and Y-9936 available from Momentive Performance Materials, Inc. Examples of the methacryloxy octyltrimethoxy silane include KBM-5803 available from Shin-Etsu Chemical Co., Ltd. Examples of the 2-(3,4-epoxycyclohexyl)ethyltrimethoxy silane include KBM-303 available from Shin-Etsu Chemical Co., Ltd., A-186 available from Momentive Performance Materials, Inc., Z-6043 available from Dow Corning Toray Co., Ltd. and SILA-ACE S530 available from Nichibi Trading Co., Ltd. Examples of the 3-glycidoxypropylmethyldimethoxy silane include KBM-402 available from Shin-Etsu Chemical Co., Ltd., Z-6044 available from Dow Corning Toray Co., Ltd. and SILA-ACE S520 available from Nichibi Trading Co., Ltd. Examples of the 3-glycidoxypropyltrimethoxy silane include KBM-403 available from Shin-Etsu Chemical Co., Ltd., A-187 available from Momentive Performance Materials, Inc., Z-6040 available from Dow Corning Toray Co., Ltd., GENIOSIL GF80 available from Wacker Asahi Kasei Silicone Co., Ltd. and SILA-ACE S510 available from Nichibi Trading Co., Ltd. Examples of the 3-glycidoxypropylmethyldiethoxy silane include KBE-402 available from Shin-Etsu Chemical Co., Ltd. Examples of the 3-glycidoxypropyltriethoxy silane include KBE-403 available from Shin-Etsu Chemical Co., Ltd., A-1871 available from Momentive Performance Materials, Inc. and GENIOSIL GF82 available from Wacker Asahi Kasei Silicone Co., Ltd. Examples of the glycidoxyoctyltrimethoxy silane include KBM-4803 available from Shin-Etsu Chemical Co., Ltd. Examples of the N-2-(aminoethyl)-3-aminopropylmethyldimethoxy silane include KBM-602 available from Shin-Etsu Chemical Co., Ltd., A-2120 available from Momentive Performance Materials, Inc., GENIOSIL GF-95 available from Wacker Asahi Kasei Silicone Co., Ltd. and SILA-ACE S310 available from Nichibi Trading Co., Ltd. Examples of the N-2-(aminoethyl)-3-aminopropyltrimethoxy silane include KBM-603 available from Shin-Etsu Chemical Co., Ltd., A-1120 available from Momentive Performance Materials, Inc., A-1122 available from Momentive Performance Materials, Inc., Z-6020 available from Dow Corning Toray Co., Ltd., Z-6094 available from Dow Corning Toray Co., Ltd., GENIOSIL GF-91 available from Wacker Asahi Kasei Silicone Co., Ltd. and SILA-ACE S320 available from Nichibi Trading Co., Ltd. Examples of the 3-aminopropyltrimethoxy silane include KBM-903 available from Shin-Etsu Chemical Co., Ltd., A-1110 available from Momentive Performance Materials, Inc., Z-6610 available from Dow Corning Toray Co., Ltd. and SILA-ACE S360 available from Nichibi Trading Co., Ltd. Examples of the 3-aminopropyltriethoxy silane include KBE-903, A-1100 available from Momentive Performance Materials, Inc., Z-6011 available from Dow Corning Toray Co., Ltd. and SILA-ACE S330 available from Nichibi Trading Co., Ltd. Examples of the 3-triethoxy silyl-N-(1,3-dimethyl-butylidene) propylamine include KBE-9103 and SILA-ACE S340 available from Nichibi Trading Co., Ltd. Examples of the N-phenyl-3-aminopropyltrimethoxy silane include KBM-573 available from Shin-Etsu Chemical Co., Ltd., Y-9669 available from Momentive Performance Materials, Inc. and Z-6883 available from Dow Corning Toray Co., Ltd. Examples of the N,N'-bis[3-(trimethoxysilyl)propyl]ethylenediamine include SILA-ACE XS1003 available from Nichibi Trading Co., Ltd. Examples of the hydrochloride of N-(vinylbenzyl)-2-aminoethyl-3-aminopropyltrimethoxy silane include KBM-575 available from Shin-Etsu Chemical Co., Ltd., Z-6032 available from Dow Corning Toray Co., Ltd. and SILA-ACE S350 available from Nichibi Trading Co., Ltd. Examples of the tris-(trimethoxysilylpropyl)isocyanurate include KBM-9659 available from Shin-Etsu Chemical Co., Ltd. Examples of the 3-mercaptopropynlmethyldimethoxy silane include KBM-802 available from Shin-Etsu Chemical Co., Ltd. and Z-6852 available from Dow Corning Toray Co., Ltd. Examples of the 3-mercaptopropyl trimethoxy silane include KBM-803 available from Shin-Etsu Chemical Co., Ltd., A-189 available from Momentive Performance Materials, Inc., Z-6062 available from Dow Corning Toray Co., Ltd. and SILA-ACE S810 available from Nichibi Trading Co., Ltd. Examples of the 3-mercaptopropyltriethoxy silane include A-1891 available from Momentive Performance Materials, Inc. and Z-6911 available from Dow Corning Toray Co., Ltd. Examples of the 3-ureidopropyltriethoxy silane include A-1160 available from Momentive Performance Materials, Inc. Examples of the 3-ureidopropyltrialkoxy silane include KBE-585 available from Shin-Etsu Chemical Co., Ltd. Examples of the bis(triethoxy silylpropyl)tetrasulfide include KBE-846 available from Shin-Etsu Chemical Co., Ltd. Examples of the 3-octanoylthio-1-propyltriethoxy silane include A-LINK599 available from Momentive Performance Materials, Inc. Examples of the 3-isocyanatepropyltriethoxy silane include KBE-9007 available from Shin-Etsu Chemical Co., Ltd. and A-1310 available from Momentive Performance Materials, Inc. Examples of the 3-isocyanatepropyltrimethoxy silane include Y-5187 available from Momentive Performance Materials, Inc. and GENIOSIL GF40 available from Wacker Asahi Kasei Silicone Co., Ltd.

The flame-retardant polypropylene composition according to the present invention may contain, as a flame-retardant aid, a polyhydric alcohol compound. The polyhydric alcohol compound is a compound in which a plurality of hydroxyl groups are bonded. Examples of the polyhydric alcohol compound include pentaerythritol, dipentaerythritol, tripentaerythritol, polypentaerythritol, neopentylglycol, trimethylolpropane, ditrimethylolpropane, 1,3,5-tris(2-hydroxyethyl)isocyanurate (THEIC), polyethylene glycol, glycerin, diglycerin, mannitol, maltitol, lactitol, sorbitol, erythritol, xylitol, xylose, sucrose (saccharose), trehalose, inositol, fructose, maltose, lactose and the like. Among the polyhydric alcohol compounds, it is preferable to use one or more selected from the group consisting of pentaerythritol and pentaerythritol condensates such as pentaerythritol, dipentaerythritol, tripentaerythritol, polypentaerythritol and the like. It is more preferable to use dipentaerythritol or pentaerythritol condensates, and it is most preferable to use dipentaerythritol. THEIC and sorbitol are also suitably used.

In the case where the polyhydric alcohol compound is contained, the blending amount of the polyhydric alcohol compound is preferably 0.01 to 10.0 parts by mass, more preferably 1.0 to 7.0 parts by mass, and even more preferably 1.5 to 3.0 parts by mass based on 100 parts by mass of the synthetic resin component in the polypropylene composition.

Furthermore, it is also preferable that the flame-retardant polypropylene composition according to the present invention contains a lubricant where necessary. Examples of the lubricant include: pure hydrocarbon-based lubricants such as liquid paraffin, natural paraffin, micro wax, synthetic paraffin, low molecular weight polyethylene and polyethylene wax; halogenated hydrocarbon-based lubricants; fatty acid-based lubricants such as higher fatty acid and hydroxy-fatty acid; fatty acid amide-based lubricants such as fatty acid amide and bisfatty acid amide; ester-based lubricants such as a lower alcohol ester of fatty acid, a polyhydric alcohol ester of fatty acid such as glyceride, a polyglycol ester of fatty acid, a fatty alcohol ester of fatty acid (ester wax); a metallic soap, fatty alcohol, polyhydric alcohol, polyglycol, polyglycerol, a lubricant made from a partial ester of fatty acid and polyhydric alcohol, a lubricant made from a partial ester of fatty acid, polyglycol and polyglycerol, a silicone oil, a mineral oil, and the like.

The blending amount of the lubricant is preferably 0.01 to 5 parts by mass based on 100 parts by mass of the synthetic resin component in the flame-retardant polypropylene composition, and more preferably 0.3 to 2 parts by mass.

The flame-retardant polypropylene composition according to the present invention may further contain, where necessary, one or more halogen-free organic and inorganic flame retarders and flame-retardant aids within the scope that does not impair the effects of the present invention. Examples of the flame retarders and flame-retardant aids include a triazine ring-containing compound, a metal hydroxide, a phosphoric acid ester-based flame retarder, a condensed phosphoric acid ester-based flame retarder, a phosphate-based flame retarder, an inorganic phosphorus-based flame retarder, a dialkyl phosphine acid salt, a silicone-based flame retarder, a metal oxide, a boric acid compound, an expandable graphite, other inorganic flame-retardant aids, other organic flame retarders, and the like.

Examples of the triazine ring-containing compound include melamine, ammeline, benzguanamine, acetguanamine, phthalodiguanamine, melamine cyanurate, butylene diguanamine, norbornene diguanamine, methylene diguanamine, ethylene dimelamine, trimethylene dimelamine, tetramethylene dimelamine, hexamethylene dimelamine, 1,3-hexylene dimelamine, and the like.

Examples of the metal hydroxide include magnesium hydroxide, aluminum hydroxide, calcium hydroxide, barium hydroxide, zinc hydroxide, KISUMA 5A (available from Kyowa Chemical Industry Co., Ltd., trade name of magnesium hydroxide), and the like.

Examples of the phosphoric acid ester-based flame retarder include trimethyl phosphate, triethyl phosphate, tributyl phosphate, tributoxyethyl phosphate, trischloroethyl phosphate, trisdichloropropyl phosphate, triphenyl phosphate, tricresyl phosphate, cresyldiphenyl phosphate, trixylenyl phosphate, octyldiphenyl phosphate, xylenyldiphenyl phosphate, trisisopropylphenyl phosphate, 2-ethylhexyldiphenyl phosphate, t-butylphenyldiphenyl phosphate, bis(t-butylphenyl)phenyl phosphate, tris(t-butylphenyl)phosphate, isopropylphenyldiphenyl phosphate, bis(isopropylphenyl)diphenyl phosphate, tris(isopropylphenyl) phosphate, and the like.

Examples of the condensed phosphoric acid ester-based flame retarder include 1,3-phenylene bis(diphenylphosphate), 1,3-phenylene bis(dixylenylphosphate), bisphenol A, bis(diphenylphosphate), and the like.

Examples of the inorganic phosphorus-based flame retarder include red phosphorus.

Examples of the dialkyl phosphine acid salt include aluminum diethylphosphinate, zinc diethylphosphinate, and the like.

Examples of the other inorganic flame-retardant aids include inorganic compounds such as titanium oxide, aluminum oxide, magnesium oxide, titanium dioxide and hydrotalcite, and products surface-treated with the above compounds. Specific examples thereof include TIPAQUE R-680 (available from Ishihara Sangyo Kaisha, Ltd., trade name of titanium oxide), Kyowamag 150 (available from Kyowa Chemical Industry Co., Ltd., trade name of magnesium oxide), DHT-4A (hydrotalcite available from Kyowa Chemical Industry Co., Ltd.), Alcamizer 4 (available from Kyowa Chemical Industry Co., Ltd., trade name of zinc-modified hydrotalcit), and the like. Various types of commercially available products can be used.

The flame-retardant polypropylene composition according to the present invention may contain, where necessary, a phenol-based antioxidant, a phosphorus-based antioxidant, a thioether-based antioxidant, an ultraviolet absorber, a hindered amine-based light stabilizer, an antioxidant, and the like.

Examples of the phenol-based antioxidant include 2,6-di-tert-butyl p-cresol, 2,6-diphenyl-4-octadecyloxyphenol, distearyl(3,5-di-tert-butyl-4-hydroxybenzyl)phosphonate, 1,6-hexamethylenebis[(3,5-di-tert-butyl-4-hydroxyphenyl) propionate amide], 4,4'-thiobis(6-tert-butyl-m-cresol), 2,2'-methylenebis(4-methyl-6-tert-butylphenol), 2,2'-methylenebis(4-ethyl-6-tert-butylphenol), 4,4'-butylidenebis(6-tert-butyl-m-cresol), 2,2'-ethylidenebis(4,6-di-tert-butylphenol), 2,2'-ethylidenebis(4-sec-butyl-6-tert-butylphenol), 1,1,3-tris(2-methyl-4-hydroxy-5-tert-butylphenyl)butane, 1,3,5-tris(2,6-dimethyl-3-hydroxy-4-tert-butylbenzyl)isocyanurate, 1,3,5-tris(3,5-di-tert-butyl-4-hydroxybenzyl)isocyanurate, 1,3,5-tris(3,5-di-tert-butyl-4-hydroxybenzyl)-2,4,6-trimethylbenzene, 2-tert-butyl-4-methyl-6-(2-acryloyloxy-3-tert-butyl-5-methylbenzyl) phenol, stearyl(3,5-di-tert-butyl-4-hydroxyphenyl) propionate, tetrakis[3-(3,5-di-tert-butyl-4-hydroxyphenyl) propionate methyl]methane, thiodiethylene glycol bis[(3,5-di-tert-butyl-4-hydroxyphenyl)propionate], 1,6-hexamethylenebis[(3,5-di-tert-butyl-4-hydroxyphenyl) propionate], bis[3,3-bis(4-hydroxy-3-tert-butylphenyl) butyric acid]glycol ester, bis[2-tert-butyl-4-methyl-6-(2-hydroxy-3-tert-butyl-5-methylbenzyl)phenyl]terephthalate, 1,3,5-tris[(3,5-di-tert-butyl-4-hydroxyphenyl)propionyloxy-ethyl]isocyanurate, 3,9-bis[1,1-dimethyl-2-{(3-tert-butyl-4-hydroxy-5-methylphenyl)propionyloxy}ethyl]-2,4,8,10-tetraoxaspiro[5,5]undecane, triethylene glycol bis[(3-tert-butyl-4-hydroxy-5-methylphenyl)propionate], and the like.

The blending amount of the phenol-based antioxidant is preferably 0.001 to 10 parts by mass, and more preferably 0.05 to 5 parts by mass based on 100 parts by mass of the synthetic resin component in the flame-retardant polypropylene composition.

Examples of the phosphorus-based antioxidant include trisnonylphenyl phosphite, tris[2-tert-butyl-4-(3-tert-butyl-4-hydroxy-5-methylphenylthio)-5-methylphenyl]phosphite, tridecyl phosphite, octyldiphenyl phosphite, di(decyl)monophenyl phosphite, di(tridecyl)pentaerythritol diphosphite, di(nonylphenyl)pentaerythritol diphosphite, bis(2,4-di-tert-butylphenyl)pentaerythritol diphosphite, bis(2,6-di-tert-butyl-4-methylphenyl)pentaerythritol diphosphite, bis(2,4,6-tri-tert-butylphenyl)pentaerythritol diphosphite, bis(2,4-dicumylphenyl)pentaerythritol diphosphite, tetra(tridecyl) isopropylidenediphenol diphosphite, tetra(tridecyl)-4,4'-n-butylidenebis(2-tert-butyl-5-methylphenol)diphosphite, hexa(tridecyl)-1,1,3-tris(2-methyl-4-hydroxy-5-tert-butylphenyl)butane triphosphite, tetrakis(2,4-di-tert-butylphenyl) biphenylene diphosphonite, 9,10-dihydro-9-oxa-10-phosphaphenanthrene-10-oxide, 2,2'-methylenebis(4,6-tert-butylphenyl)-2-ethylhexylphosphite, 2,2'-methylenebis(4,6-tert-butylphenyl)-octadecyl phosphite, 2,2'-ethylidenebis(4,6-di-tert-butylphenyl)fluoro phosphite, tris(2-[(2,4,8,10-tetrakis-tert-butyldibenzo[d,f][1,3,2]dioxaphosphepine-6-yl)oxy]ethyl)amine, 2-ethyl-2-butylpropylene glycol, 2,4,6-tri-tert-butylphenol phosphite, tris(2,4-di-tert-butylphenyl) phosphite, and the like.

The blending amount of the phosphorus-based antioxidant is preferably 0.001 to 10 parts by mass, and more preferably 0.05 to 5 parts by mass based on 100 parts by mass of the synthetic resin component in the flame-retardant polypropylene composition.

Examples of the thioether-based antioxidant include: dialkyl thiodipropionates such as dilauryl thiodipropionate, dimyristyl thiodipropionate and distearyl thiodipropionate; and pentaerythritol tetra(β-alkylthiopropionic acid esters.

The blending amount of the thioether-based antioxidant is preferably 0.001 to 10 parts by mass, and more preferably 0.05 to 5 parts by mass based on 100 parts by mass of the synthetic resin component in the flame-retardant polypropylene composition.

Examples of the ultraviolet absorber include: 2-hydroxybenzophenones such as 2,4-dihydroxy benzophenone, 2-hydroxy-4-methoxy benzophenone, 2-hydroxy-4-octoxy benzophenone and 5,5'-methylenebis(2-hydroxy-4-methoxybenzophenone); 2-(2'-hydroxyphenyl) benzotriazoles such as 2-(2'-hydroxy-5'-methylphenyl) benzotriazole, 2-(2'-hydroxy-3',5'-di-tert-butylphenyl)-5-chlorobenzotriazole, 2-(2'-hydroxy-3'-tert-butyl-5'-methylphenyl)-5-chlorobenzotriazole, 2-(2'-hydroxy-5'-tert-octylphenyl)benzotriazole, 2-(2'-hydroxy-3',5'-dicumylphenyl)benzotriazole, 2,2'-methylenebis(4-tert-octyl-6-(benzotriazolyl)phenol) and 2-(2'-hydroxy-3'-tertbutyl-5'-carboxyphenyl)benzotriazole; benzoates such as phenyl salicylate, resorcinol monobenzoate, 2,4-di-tert-butylphenyl-3,5-di-tert-butyl-4-hydroxybenzoate, 2,4-di-tert-amylphenyl-3,5-di-tert-butyl-4-hydroxybenzoate and hexadecyl-3,5-di-tert-butyl-4-hydroxybenzoate; substituted oxanilides such as 2-ethyl-2'-ethoxy oxanilide and 2-ethoxy-4'-dodecyl oxanilide; cyanoacrylates such as ethyl-α-cyano-β,β-diphenyl acrylate and methyl-2-cyano-3-methyl-3-(p-methoxyphenyl)acrylate; and triaryltriazines such as 2-(2-hydroxy-4-octoxyphenyl)-4,6-bis(2,4-di-tert-butylphenyl)-s-triazine, 2-(2-hydroxy-4-methoxyphenyl)-4,6-diphenyl-s-triazine and 2-(2-hydroxy-4-propoxy-5-methylphenyl)-4,6-bis(2,4-di-tert-butylphenyl)-s-triazine.

The blending amount of the ultraviolet absorber is preferably 0.001 to 30 parts by mass, and more preferably 0.05 to 10 parts by mass based on 100 parts by mass of the synthetic resin component in the flame-retardant polypropylene composition.

Examples of the hindered amine-based light stabilizer include hindered amine compounds such as 2,2,6,6-tetramethyl-4-piperidylstearate, 1,2,2,6,6-pentamethyl-4-piperidylstearate, 2,2,6,6-tetramethyl-4-piperidylbenzoate, bis(2,2,6,6-tetramethyl-4-piperidyl)sebacate, bis(1,2,2,6,6-tetramethyl-4-piperidyl)sebacate, bis(1-octoxy-2,2,6,6-tetramethyl-4-piperidyl)sebacate, tetrakis(2,2,6,6-tetramethyl-4-piperidyl)-1,2,3,4-butanetetra carboxylate, tetrakis(1,2,2,6,6-pentamethyl-4-piperidyl)-1,2,3,4-butanetetra carboxylate, bis(2,2,6,6-tetramethyl-4-piperidyl).di(tridecyl)-1,2,3,4-butanetetra carboxylate, bis(1,2,2,6,6-pentamethyl-4-piperidyl).di(tridecyl)-1,2,3,4-butanetetra carboxylate, bis(1,2,2,4,4-pentamethyl-4-piperidyl)-2-butyl-2-(3,5-di-tert-butyl-4-hydroxybenzyl)malonate, 1-(2-hydroxyethyl)-2,2,6,6-tetramethyl-4-piperidinol/succinic acid diethyl polycondensate, 1,6-bis(2,2,6,6-tetramethyl-4-piperidylamino)hexane/2,4-dichloro-6-morpholino-s-triazine polycondensate, 1,6-bis(2,2,6,6-tetramethyl-4-piperidylamino)hexane/2,4-dichloro-6-tert-octylamino-s-triazine polycondensate, 1,5,8,12-tetrakis[2,4-bis(N-butyl-N-(2,2,6,6-tetramethyl-4-piperidyl)amino)-s-triazine-6-yl]-1,5,8,12-tetraazadodecane, 1,5,8,12-tetrakis[2,4-bis(N-butyl-N-(1,2,2,6,6-pentamethyl-4-piperidyl)amino)-s-triazine-6-yl]-1,5,8-12-tetraazadodecane, 1,6,11-tris[2,4-bis(N-butyl-N-(2,2,6,6-tetramethyl-4-piperidyl)amino)-s-triazine-6-yl]aminoundecane and 1,6,11-tris[2,4-bis(N-butyl-N-(1,2,2,6,6-pentamethyl-4-piperidyl)amino)-s-triazine-6-yl]aminoundecane.

The blending amount of the hindered amine-based light stabilizer is preferably 0.001 to 30 parts by mass, and more preferably 0.05 to 10 parts by mass based on 100 parts by mass of the synthetic resin component in the flame-retardant polypropylene composition.

Examples of the antioxidant include a naphthylamine-based antioxidant, a diphenylamine-based antioxidant, a p-phenyldiamine-based antioxidant, a quinoline-based antioxidant, a hydroquinone derivative, a monophenol-based antioxidant, a thiobisphenol-based antioxidant, a hindered phenol-based antioxidant, a phosphorous acid ester-based antioxidant, and the like. The blending amount of the antioxidant is preferably 0.001 to 10 parts by mass, and more preferably 0.05 to 5 parts by mass based on 100 parts by mass of the synthetic resin component in the flame-retardant polypropylene composition.

The flame-retardant polypropylene composition according to the present invention may contain a reinforcement material as an optional component within the scope that does not impair the effects of the present invention. As the reinforcement material, it is possible to use fibrous, platy, particulate and powder reinforcement materials that are commonly used to reinforce synthetic resins. Specific examples include: inorganic fibrous reinforcement materials such as glass fibers, asbestos fibers, carbon fibers, graphite fibers, metal fibers, potassium titanate whisker, aluminum borate whisker, magnesium-based whisker, silicon-based whisker, wollastonite, sepiolite, asbestos, slug fibers, zonolite, ellestadite, gypsum fibers, silica fibers, silica.alumina fibers, zirconia fibers, boron nitride fibers, silicon nitride fibers and boron fibers; organic fibrous reinforcement materials such as polyester fibers, nylon fibers, acrylic fibers, regenerated cellulose fibers, acetate fibers, kenaf, ramie, cotton, jute, hemp, sisal, flax, linen, silk, manila hemp, sugar cane, wood pulp, wastepaper, recycled wastepaper and wool; and platy and particulate reinforcement materials such as glass flake, non-swelling mica, graphite, metal foil, ceramic bead, clay, mica, sericite, zeolite, bentonite, dolomite, kaolin, micronized silicic acid, feldspar powder, potassium titanate, shirasu-balloon, calcium carbonate, magnesium carbonate, barium sulfate, calcium oxide, aluminum oxide, titanium oxide, titanium dioxide, aluminum silicate, gypsum, novaculite, dawsonite and white clay. The reinforcement material may be coated with or bundled by a thermoplastic resin such as an ethylene/vinyl acetate copolymer or a thermosetting resin such as epoxy resin, or may be treated with a coupling agent such as amino silane or epoxy silane.

The flame-retardant polypropylene composition according to the present invention may contain, as an optional component, a layered silicate within the scope that does not impair the effects of the present invention. Examples of the layered silicate include: smectite-based clay minerals such as montmorillonite, saponite, hectorite, beidellite, stevensite, nontronite; vermiculite; halloysite; swelling mica; and talc. It is also possible to use a layered silicate in which organic cations, quaternary ammonium cations or phosphonium cations are intercalated between layers.

The flame-retardant polypropylene composition according to the present invention may further contain, as an optional component, a crystal nucleator within the scope that does not impair the effects of the present invention. As the crystal nucleator, a crystal nucleator commonly used for polymers can be used as appropriate, and in the present invention, it is possible to use either an inorganic crystal nucleator or an organic crystal nucleator.

Specific examples of the inorganic crystal nucleator include metallic salts such as kaolinite, synthetic mica, clay zeolite, graphite, carbon black, magnesium oxide, titanium oxide, calcium sulfide, boron nitride, calcium carbonate, barium sulfate, aluminum oxide, neodymium oxide and phenylphosphonate. The inorganic crystal nucleator may be modified with an organic substance in order to enhance dispersibility in the composition.

Specific examples of the organic crystal nucleator include: organic carboxylic acid metal salts such as sodium benzoate, potassium benzoate, lithium benzoate, calcium benzoate, magnesium benzoate, barium benzoate, lithium terephthalate, sodium terephthalate, potassium terephthalate, calcium oxalate, sodium laurate, potassium laurate, sodium myristate, potassium myristate, calcium myristate, sodium octacosanoate, calcium octacosanoate, sodium stearate, potassium stearate, lithium stearate, calcium stearate, magnesium stearate, barium stearate, sodium montanate, calcium montanate, sodium toluate, sodium salicylate, potassium salicylate, zinc salicylate, aluminum dibenzoate, potassium dibenzoate, lithium dibenzoate, sodium β-naphthalate and sodium cyclohexane carboxylate; organic sulfonic acid salts such as sodium p-toluenesulfonate and sodium sulfoisophthalate; carboxylic amides such as stearic amide, ethylenebis lauric amide, palmitic amide, hydroxy stearic amide, erucic amide and trimesic acid tris(t-butylamide); benzylidene sorbitol and derivatives thereof; phosphorus compound metal salts such as sodium-2,2'-methylenebis(4,6-di-t-butylphenyl)phosphate; and 2,2-methylbis(4,6-di-t-butylphenyl)sodium.

The flame-retardant polypropylene composition according to the present invention may contain, as an optional component, a plasticizer within the scope that does not impair the effects of the present invention. As the plasticizer, a plasticizer commonly used for polymers can be used as appropriate, and examples include a polyester-based plasticizer, a glycerin-based plasticizer, a polycarboxylic acid ester-based plasticizer, a polyalkylene glycol-based plasticizer, an epoxy-based plasticizer, and the like.

Specific examples of the polyester-based plasticizer include: polyesters composed of an acid component such as adipic acid, sebacic acid, terephthalic acid, isophthalic acid, naphthalenedicarboxylic acid, diphenyl dicarboxylic acid or rosin and a diol component such as propylene glycol, 1,3-butanediol, 1,4-butanediol, 1,6-hexanediol, ethylene glycol or diethylene glycol; and polyesters composed of a hydroxycarboxylic acid such as polycaprolactone. The polyesters may be end-capped with a monofunctional carboxylic acid or a monofunctional alcohol, or may be end-capped with an epoxy compound or the like.

Specific examples of the glycerin-based plasticizer include glycerin monoaceto monolaurate, glycerin diaceto monolaurate, glycerin monoaceto monostearate, glycerin diaceto monooleate, glycerin monoaceto monomontanate, and the like.

Specific examples of the polycarboxylic acid ester-based plasticizer include: phthalic acid esters such as dimethyl phthalate, diethyl phthalate, dibutyl phthalate, dioctyl phthalate, diheptyl phthalate, dibenzyl phthalate and butylbenzyl phthalate; trimellitic acid esters such as tributyl trimellitate, trioctyl trimellitate and trihexyl trimellitate; adipic acid esters such as diisodecyl adipate, n-octyl-n-decyl adipate, methyldiglycol butyldiglycol adipate, benzylmethyl diglycol adipate and benzylbutyl diglycol adipate; citric acid esters such as acetyl triethyl citrate and acetyl tributyl citrate; azelaic acid esters such as di-2-ethylhexyl azelate; and sebacic acid esters such as dibutyl sebacate, di-2-ethylhexyl sebacate, and the like.

Specific examples of the polyalkylene glycol-based plasticizer include: polyalkylene glycols including polyethylene glycol, polypropylene glycol, poly(ethyleneoxide-propyleneoxide) block and/or random copolymer, polytetramethylene glycol, ethylene oxide addition polymers of bisphenols, propylene oxide addition polymers of bisphenols, tetrahydrofuran addition polymers of bisphenols; and end capping compounds such as an epoxy-end-modified compound, an ester-end-modified compound and an ether-end-modified compound of the above-listed polyalkylene glycols.

In general, "epoxy-based plasticizer" refers to epoxy triglyceride composed of epoxy alkyl stearate and soybean oil, or the like, but it is also possible to use a so-called epoxy resin composed mainly of bisphenol A and epichlorohydrin.

Specific examples of other plasticizers include: benzoic acid esters of aliphatic polyols such as neopentyl glycol dibenzoate, diethylene glycol dibenzoate and triethylene glycol di-2-ethyl butyrate; fatty acid amides of amide stearates; aliphatic carboxylic acid esters such as butyl oleate; oxyacid esters such as methyl acetyl ricinoleate and butyl acetyl ricinoleate; pentaerythritol; various types of sorbitols; polyacrylic acid esters; paraffins; and the like.

In the case where the plasticizer is used in the present invention, the plasticizer listed above may be used singly or in a combination of two or more.

The flame-retardant polypropylene composition according to the present invention may further contain, as an optional component, an acrylic processing aid within the scope that does not impair the effects of the present invention. As the acrylic processing aid, a polymer of a (meth) acrylic acid ester or a copolymer of two or more (meth) acrylic acid esters can be used.

Also, the flame-retardant polypropylene composition according to the present invention can contain an anti-dripping agent within the scope that does not impair the effects of the present invention, but inclusion of a fluorine-based anti-dripping agent is not preferable from the viewpoint of achieving a halogen-free environment to reduce an environmental load and also because the physical properties of the random copolymer polypropylene may be lost. Examples of the fluorine-based anti-dripping agent include: fluorine-based resins such as polytetrafluoroethylene, polyvinylidene fluoride and polyhexafluoropropylene; perfluoroalkane sulfonic acid alkali metal salt compounds such as perfluoromethane sulfonic acid sodium salt, perfluoro-n-butane sulfonic acid potassium salt, perfluoro-t-butane sulfonic acid potassium salt, perfluorooctane sulfonic acid sodium salt and perfluoro-2-ethylhexane sulfonic acid calcium salt; and perfluoroalkane sulfonic acid alkaline earth metal salt.

Other than the above, the flame-retardant polypropylene composition according to the present invention may contain, where necessary additives that are usually used in synthetic resins such as for example, a cross-linking agent, an antistatic agent, a metallic soap, a filler, an antifog agent, a plate-out preventing agent, a surface treating agent, a fluorescent agent, a fungicide, an antimicrobial agent, a foaming agent, a metal deactivating agent, a mold release agent, a pigment, and a processing aid within the scope that does not impair the effects of the present invention.

In the present invention, in the case where optional components (excluding the resin other than the random copolymer polypropylene) other than the random copolymer polypropylene or the components (A) to (C) are contained, the total blending amount of the optional components is preferably 40 parts by mass or less, and more preferably 20 parts by mass or less based on 100 parts by mass of the random copolymer polypropylene. However, the blending amount is not particularly limited thereto as long as it is within the scope that does not impair the effects of the present invention.

The flame-retardant polypropylene composition according to the present invention may contain, as a resin component, a synthetic resin other than the random copolymer polypropylene or the styrene-based thermoplastic elastomer described above. Examples of the synthetic resin include: polyolefins and copolymers thereof such as α-olefin polymers including homopolypropylene, block copolymer polypropylene, high-density polyethylene, low-density polyethylene, linear low-density polyethylene, cross-linked polyethylene, super-high molecular weight polyethylene, polybutene-1 and poly-3-methylpentene; ethylenevinyl acetate copolymer, ethylene-ethyl acrylate copolymer and ethylene propylene copolymer; halogen-containing resins such as poly(vinyl chloride), poly(vinylidene chloride), chlorinated polyethylene, chlorinated polypropylene, polyvinylidene fluoride, chlorinated rubber, vinyl chloride-vinyl acetate copolymer, vinyl chloride-ethylene copolymer, vinyl chloride-vinylidene chloride copolymer, a ternary copolymer of vinyl chloride, vinylidene chloride and vinyl acetate, a copolymer of vinyl chloride and acrylic acid ester, a copolymer of vinyl chloride and maleic acid ester, a copolymer of vinyl chloride and cyclohexyl maleimide; petroleum resin, cumarone resin, polystyrene, polyvinyl acetate, acrylic resin, polymethylmethacrylate, polyvinyl alcohol, polyvinyl formal, polyvinyl butyral; polyalkyleneterephthalates such as polyethyleneterephthalate, polybutyleneterephthalate and polycyclohexane dimethyleneterephthalate; aromatic polyesters such as polyalkylenenaphthalates including polyethylenenaphthalate and polybutylenenaphthalate; linear polyesters such as polytetramethyleneterephthalate; degradable aliphatic polyesters such as polyhydroxy butyrate, polycaprolactone, polybutylene succinate, polyethylene succinate, poly(lactic acid) resin, polymalic acid, polyglycolic acid, polydioxane and poly(2-oxetanone); thermoplastic resins such as polyphenyleneoxide, polyamides including polycaprolactam and polyhexamethylene adipamide, polycarbonate, branched polycarbonate, polyacetal, polyphenylene sulfide, polyurethane and fibrous resin, and blends thereof; thermosetting resins such as phenol resin, urea resin, melamine resin, epoxy resin and unsaturated polyester resin; fluorine-based resin, silicone resin, silicone rubber polyethersulfone, polysulfone, polyphenylene ether, polyether ketone, polyether ether ketone, liquid crystal polymer, and the like. Additional examples include isoprene rubber, butadiene rubber, acrylonitrile-butadiene copolymer rubber, styrene-butadiene copolymer rubber, fluorocarbon rubber, silicone rubber, and the like. Specific examples of the synthetic resin include an olefin-based thermoplastic elastomer, a polyurethane-based thermoplastic elastomer, a polyester-based thermoplastic elastomer, a nitrile-based thermoplastic elastomer, a nylon-based thermoplastic elastomer, a vinyl chloride-based thermoplastic elastomer, a polyamide-based thermoplastic elastomer, and the like.

The synthetic resins listed above may be used singly or in a combination of two or more. Also, the synthetic resins may be alloyed.

The synthetic resins can be used regardless of molecular weight, the degree of polymerization, density, softening point, the proportion of insoluble substances in solvents, the degree of stereoregularity, the presence or absence of catalyst residue, the type and blending ratio of starting monomer, the type of polymerization catalyst (for example, a ziegler catalyst, a metallocene catalyst, or the like), and the like.

When producing the flame-retardant polypropylene composition according to the present invention, there is no particular limitation on the timing at which the components (A) and (B) and optionally the component (C) are blended with the random copolymer polypropylene. For example, the components (A) to (C) may be blended with the random copolymer polypropylene by including two or more selected from the components (A) to (C) in a one-pack form in advance, or by blending each component with the random copolymer polypropylene.

In the case where two or more selected from the components (A) to (C) are included in a one-pack form, each component may be pulverized before being mixed, or each component may be mixed and then pulverized. The same applies to the case where the resin other than the random copolymer polypropylene and other optional components are blended.

By molding the flame-retardant polypropylene composition according to the present invention, it is possible to obtain a lightweight molded article having an excellent flame retardancy and excellent resin physical properties.

From the viewpoint of flame retardancy, resin physical properties and weight reduction, the molded article according to the present invention preferably has a density of 1020 $kg/m^3$ or less, more preferably 1010 $kg/m^3$ or less, and even more preferably 1005 $kg/m^3$ or less. The lower limit of the density of the molded article according to the present invention is preferably 900 $kg/m^3$ or more, and more preferably 950 $kg/m^3$ or more from the viewpoint of ease of production.

There is no particular limitation on the method for molding the molded article, and extrusion processing, calender processing, injection molding, roll molding, compression molding, blow molding and the like can be used. It is possible to produce molded products having various types of shapes such as a resin plate, a sheet, a film and a profile.

The flame-retardant polypropylene composition according to the present invention and a molded article obtained therefrom can be used in a wide variety of industrial fields such as electric, electronic and communication fields, agriculture, forestry and fishery fields, mining, construction, foods, fibers, clothing, medical care, coal, petroleum, rubber, leather, automobiles, precision equipment, wood materials, building materials, civil engineering materials, furniture, printing and musical instruments. More specific examples include office supplies and office automation equipment such as a printer, a personal computer, a word processor, a keyboard, a PDA (personal digital assistant), a telephone, a copy machine, a facsimile machine, an ECR (electronic cash register), an electronic calculator, an electronic organizer, a card, a holder and stationary; household electric appliances such as a washing machine, a refrigerator, a vacuum cleaner, a microwave oven, a luminaire, a gaming console, an iron, a Japanese table heater; audiovisual (AV) equipment such as a television (TV) set, a videotape recorder (VTR), a video camera, a radio-cassette recorder, a tape recorder, a mini disc, a CD player, a speaker and a liquid crystal display; electric and electronic components, and communication devices such as a connector, a relay, a capacitor, a switch, a printed-circuit board, a coil bobbin, a semiconductor sealing material, an LED sealing material, an electric wire, a cable, a transformer, a deflection yoke, a distribution switch board and a clock; housings (a frame, a casing, a cover and exterior components) and components for office automation equipment; and automobile interior and exterior materials.

Furthermore, the flame-retardant polypropylene composition according to the present invention and the molded article obtained therefrom are used in a wide variety of applications: materials for automobile, hybrid car, electric vehicle, vehicle, vessel, aircraft, building, house and construction purposes such as a seat (padding, surface material, or the like), a belt, a ceiling covering, a convertible top cover, an armrest, a door trim, a rear package tray, a carpet, a mat, a sun visor, a wheel cover, a mattress cover, an airbag, an insulating material, a strap hanger, a strap hanger belt, an electric wire coating material, an electric insulating material, a paint, a coating material, a covering material, a floor material, a corner wall, a carpet, a wall paper, a wall covering material, an exterior material, an interior material, a roofing material, a decking material, a wall material, a post material, a floor plate, a fence material, a framework and a molding, a window and a door forming material, a shingle, a panel, a terrace, a balcony, a sound insulation plate, a heat insulation plate, and a window material; a civil engineering material, clothing, a curtain, a bedsheet, a plywood board, a synthetic fiber plate, a rug, a door mat, a sheet, a bucket, a hose, a container, a pair of glasses, a bag, a case, a pair of goggles, a pair of skis, a racket, a tent, a music instrument, and other houseware goods and sports goods.

EXAMPLES

Hereinafter, the present invention will be described in detail by way of examples. Note that, however, the present invention is not limited to the following examples. The compositions shown in Table 1 are given in parts by mass.

Examples 1 to 4 and Comparative Examples 1 to 12

A flame-retardant polypropylene composition having a component composition shown in Tables 1 and 2 given below was prepared. Next, the flame-retardant polypropylene composition was extruded at 200 to 230° C. to produce pellets. The pellets were injection molded at 200° C. to obtain a test specimen having a length of 127 mm, a width of 12.7 mm and a thickness of 1.6 mm. The UL-94V test was conducted by using the obtained test specimen in the following manner as a flammability test. The results are shown in Tables 1 and 2.

Also, the mass and volume of the test specimen of Example 2 were measured, and the density of the molded article was calculated. The result is shown in Table 1.

Likewise, comparative examples were performed by using the compositions shown in Tables 1 and 2. In the comparative examples, the random copolymer polypropylene used in the examples was replaced by a homopolypropylene or a block copolymer polypropylene. The results are shown in Tables 1 and 2.

Also, the mass and volume of the test specimen of each of Comparative Examples 4 and 8 were measured, and the density of the molded article was calculated. The results are shown in Table 1.

UL-94V Flammability Test

A test specimen having a length of 127 mm, a width of 12.7 mm and a thickness of 1.6 mm was held vertically, and the flame of a burner was applied to a lower end of the test specimen for ten seconds and then removed, and the time required for the flame on the test specimen to extinguish was measured. Next, the flame of the burner was applied for ten seconds for the second time at the same time when the flame on the test specimen extinguished, and the time required for the flame on the test specimen to extinguish was measured in the same manner as in the first time. At the same time, evaluation was made as to whether or not a cotton pad placed below the test specimen was burnt due to burning drips dropping thereon.

Then, the test specimen was rated in accordance with the UL-94V standard based on the burning time obtained from the first measurement and the second measurement, whether or not the cotton pad was burnt, and the like. V-0 indicates the highest rate, and the flame retardancy decreases as the rating number increases such as V-1 and V-2. A rate of NR was given to a test specimen that was not rated as any of the ratings V-0 to V-2.

TABLE 1

| Composition | Example | | Comparative Example | | | | | | | |
|---|---|---|---|---|---|---|---|---|---|---|
| | 1 | 2 | 1 | 2 | 3 | 4 | 5 | 6 | 7 | 8 |
| Random copolymer polypropylene*1 | 75 | 80 | | | | | | | | |
| Homopolypropylene*2 | | | 75 | 73 | 80 | 76 | | | | |
| Block copolymer polypropylene*3 | | | | | | | 75 | 72 | 80 | 75 |
| Component (A): melamine pyrophosphate*4 | 10 | 8 | 10 | 10.8 | 8 | 9.6 | 10 | 11.2 | 8 | 10 |
| Component (B): piperazine pyrophosphate*5 | 15 | 12 | 15 | 16.2 | 12 | 14.4 | 15 | 16.8 | 12 | 15 |
| Component (C): zinc oxide | | 1.0 | | | | 1.0 | 1.2 | | 1.0 | 1.25 |
| Calcium stearate (lubricant) | 0.1 | 0.1 | 0.1 | 0.1 | 0.1 | 0.1 | 0.1 | 0.1 | 0.1 | 0.1 |
| Phenol-based antioxidant*6 | 0.1 | 0.1 | 0.1 | 0.1 | 0.1 | 0.1 | 0.1 | 0.1 | 0.1 | 0.1 |
| Phosphorus-based antioxidant*7 | 0.1 | 0.1 | 0.1 | 0.1 | 0.1 | 0.1 | 0.1 | 0.1 | 0.1 | 0.1 |
| Glycerin monostearate (lubricant) | 0.3 | 0.3 | 0.3 | 0.3 | 0.3 | 0.3 | 0.3 | 0.3 | 0.3 | 0.3 |
| Flammability test UL-94V (1.6 mm) | V-0 | V-0 | NR | V-2 | V-2 | V-2 | NR | V-2 | V-2 | V-2 |
| Density (kg/m³) | — | 998 | — | — | — | 1033 | — | — | — | 1030 |

*1Random copolymer polypropylene: a random copolymer of propylene and ethylene containing 3 mass % of ethylene in the monomer to be copolymerized, melt flow rate = 8 g/10 min.
*2Homopolypropylene: melt flow rate = 8 g/10 min.
*3Block copolymer polypropylene: melt flow rate = 8 g/10 min.
*4Melamine pyrophosphate: the molar ratio of pyrophosphoric acid and melamine is 1:2
*5Piperazine pyrophosphate: the molar ratio of pyrophosphoric acid and piperazine is 1:1.
*6Tetrakis[3-(3,5-di-tert-butyl-4-hydroxyphenyl) propionate methyl]methane
*7Tris(2,4-di-tert-butylphenyl)phosphite

TABLE 2

| Composition | Example | | Comparative Example | | | |
|---|---|---|---|---|---|---|
| | 3 | 4 | 9 | 10 | 11 | 12 |
| Random copolymer polypropylene*1 | 56 | 42 | | | | |
| Homopolypropylene*2 | | | 56 | 42 | | |
| Block copolymer polypropylene*3 | | | | | 56 | 42 |
| Styrene-based thermoplastic elastomer*8 | 28 | 42 | 28 | 42 | 28 | 42 |
| Component (A): melamine pyrophosphate*4 | 6.4 | 6.4 | 6.4 | 6.4 | 6.4 | 6.4 |
| Component (B): piperazine pyrophosphate*5 | 9.6 | 9.6 | 9.6 | 9.6 | 9.6 | 9.6 |
| Component (C): zinc oxide | 0.8 | 0.8 | 0.8 | 0.8 | 0.8 | 0.8 |
| Calcium stearate (lubricant) | 0.1 | 0.1 | 0.1 | 0.1 | 0.1 | 0.1 |
| Phenol-based antioxidant*6 | 0.1 | 0.1 | 0.1 | 0.1 | 0.1 | 0.1 |

TABLE 2-continued

| Composition | Example | | Comparative Example | | | |
|---|---|---|---|---|---|---|
| | 3 | 4 | 9 | 10 | 11 | 12 |
| Phosphorus-based antioxidant*[7] | 0.1 | 0.1 | 0.1 | 0.1 | 0.1 | 0.1 |
| Glycerin monostearate (lubricant) | 0.3 | 0.3 | 0.3 | 0.3 | 0.3 | 0.3 |
| Flammability test UL-94V (1.6 mm) | V-0 | V-0 | NR | NR | NR | NR |

*[1]Random copolymer polypropylene: a random copolymer of propylene and ethylene containing 3 mass % of ethylene in the monomer to be copolymerized, melt flow rate = 8 g/10 min.
*[2]Homopolypropylene: melt flow rate = 8 g/10 min.
*[3]Block copolymer polypropylene: melt flow rate = 8 g/10 min.
*[4]Melamine pyrophosphate: the molar ratio of pyrophosphoric acid and melamine is 1:2
*[5]Piperazine pyrophosphate: the molar ratio of pyrophosphoric acid and piperazine is 1:1.
*[6]Tetrakis[3-(3,5-di-tert-butyl-4-hydroxyphenyl) propionate methyl]methane
*[7]Tris(2,4-di-tert-butylphenyl)phosphite
*[8]Hydrogenated styrene-based thermoplastic elastomer (product name: Tuftec H1062 (available from Asahi Kasei Chemicals Corporation))

The invention claimed is:

1. A flame-retardant polypropylene composition comprising:
  40 mass % to 90 mass % of a random copolymer polypropylene selected from the group consisting of:
    a random copolymer of polypropylene and ethylene, wherein ethylene monomer is 5.0 mass % or less,
    a random copolymer of polypropylene, ethylene, and butane-1, wherein ethylene monomer is 5.0 mass % or less, and
    a random copolymer of polypropylene and butane-1, as a synthetic resin component; and
  10 mass % to 35 mass % of flame retardant components comprising a component (A) and a component (B), in a mass ratio of component (A)/component (B) of 20/80 to 50/50,
  the component (A) being one or more melamine salts selected from the group consisting of melamine orthophosphate, melamine pyrophosphate, and melamine polyphosphate, and
  the component (B) being one or more piperazine salts selected from the group consisting of piperazine orthophosphate, piperazine pyrophosphate, and piperazine polyphosphate,
  wherein said composition does not contain a fluorine-based antidripping agent.

2. The flame-retardant polypropylene composition according to claim 1, wherein said flame retardant components further comprise zinc oxide as a component (C).

3. The flame-retardant polypropylene composition according to claim 1, further comprising a styrene-based thermoplastic elastomer as a synthetic resin component.

4. A molded article obtained from the flame-retardant polypropylene composition according to claim 1.

5. The molded article according to claim 4, having a density of 1020 kg/m$^3$ or less.

6. The flame-retardant polypropylene composition according to claim 2, further comprising a styrene-based thermoplastic elastomer as a synthetic resin component.

7. A molded article obtained from the flame-retardant polypropylene composition according to claim 2.

8. A molded article obtained from the flame-retardant polypropylene composition according to claim 3.

9. A molded article obtained from the flame-retardant polypropylene composition according to claim 6.

10. The flame-retardant polypropylene composition according to claim 3, the styrene-based thermoplastic elastomer is a hydrogenated styrene-based elastomer.

11. The flame-retardant polypropylene composition according to claim 10, the hydrogenated styrene-based elastomer is selected from the group consisting of styrene-ethylene-butylene-styrene (SEBS) resin, styrene-ethylene-propylene-styrene (SEPS) resin, styrene-ethylene-propylene (SEP) resin and styrene-ethylene-ethylene-propylene-styrene (SEEPS) resin.

* * * * *